United States Patent [19]

Nomura et al.

[11] Patent Number: 5,794,072

[45] Date of Patent: Aug. 11, 1998

[54] TIMING METHOD AND APPARATUS FOR INTERLEAVING PIO AND DMA DATA TRANSFERS

[75] Inventors: Koichi Eugene Nomura, Phoenix; Gary D. Hicok, Mesa; David K. Cassetti, Tempe; Franklyn H. Story, Chandler, all of Ariz.

[73] Assignee: VLSI Technology, Inc., San Jose, Calif.

[21] Appl. No.: 652,780

[22] Filed: May 23, 1996

[51] Int. Cl.$^6$ .................................................. G06F 17/00
[52] U.S. Cl. .................... 395/860; 395/843; 395/848; 395/868; 395/865; 395/864; 395/294; 345/518
[58] Field of Search ..................... 345/518; 395/294, 395/843, 848, 868, 860, 865, 864, 518

[56] References Cited

U.S. PATENT DOCUMENTS

| | | | |
|---|---|---|---|
| 4,275,868 | 6/1981 | Adams, Jr. et al. | 395/868 |
| 4,716,523 | 12/1987 | Burrus, Jr. et al. | 395/848 |
| 5,276,818 | 1/1994 | Okazawa et al. | 395/294 |
| 5,426,734 | 6/1995 | Nakaoka | 345/518 |
| 5,551,054 | 8/1996 | Packer | 395/843 |

OTHER PUBLICATIONS

Ron Wilson, "*VLSI Launches Lynx set for Pentium,*" Electronic Engineering Times, Jun. 19, 1995, Issue 853.

"SFF Committee Information Specification for Bus Master Programming Interface for IDE ATA Controllers", 1995 Intel Corporation.

Stephen G. Finch, "Information technology—AT Attachment Interface with Extensions (ATA-2)", Rev. 3, Jan. 17, 1995, Silicon Systems, Inc.

Primary Examiner—Wayne Amsbury
Assistant Examiner—Thuy Pardo
Attorney, Agent, or Firm—Hickman & Martine, LLP

[57] ABSTRACT

The present invention is directed at prioritizing and interleaving data transfer protocols between storage mediums and main memories. The invention includes a controller interface that is operatively connected to a plurality of storage mediums, a main memory and a central processing unit (CPU). The controller interface is preferably configured to receive and detect data transfer protocol requests having different timing parameters. Once the controller interface receives a data transfer protocol request, an arbitration unit that is operatively coupled to said controller interface assigns priorities to the detected data transfer protocols having different timing parameters. The arbitration unit then compares the assigned priorities, and interrupts an on-going data transfer protocol when a newly received data transfer protocol is assigned a higher priority. The data transfer protocol assigned the high priority is then commenced and proceeds to completion. Once the high priority data transfer protocol is complete, the interrupted data transfer protocols may be resumed.

22 Claims, 5 Drawing Sheets

| PIO MODE BEGINS | | NO EARLIER THAN LATER OF |
|---|---|---|
| $T_{320}$ | = | $T_{314} + (T_{kr}$ or $T_{Kw})$ |
| $T_{320}$ | = | $T_{314} + (T_F$ or $T_H)$ |
| $T_{320}$ | = | $T_{314} + T_J$ |

FIG. 4

| DMA MODE RESUMES | | NO EARLIER THAN LATER OF |
|---|---|---|
| $T_{324}$ | = | $T_{321} + T_{2i} (T_{2i} = T_o - T_2(8bit))$ |
| $T_{324}$ | = | $T_{321} + (T_4(write)$ or $T_6(read))$ |
| $T_{324}$ | = | $T_{321} + T_9$ |

TIMING METHOD AND APPARATUS FOR INTERLEAVING PIO AND DMA DATA TRANSFERS

BACKGROUND OF THE INVENTION

The present invention relates generally to data transfers, and more particularly, to defining timing requirements for performing successive data transfers using multiple data transfer protocols over an intelligent interface.

There are many well-known protocols available for transferring data stored in storage mediums to, and from main memories (e.g., random access memories "RAMs"). By way of example, data transfers between a storage device and a main memory may be initiated in response to a CPU programming input/output (PIO) mode instruction or, alternatively in response to a direct memory access (DMA) data transfer instruction. In general, when a DMA mode data transfer (to or from a storage medium) is requested, a preliminary PIO mode access will be performed in order to access control registers in the storage mediums and identify the specific address from which the data transfer will be performed. Following the preliminary PIO data access, the complete DMA mode data transfer will be carried out without interruption.

On the other hand, if a PIO mode data transfer is requested, the system CPU will generally initiate a data transfer through special input/output (I/O) instructions which prompt the data transfer between specific address registers on the storage mediums and main memory. Although there are many conventional interfacing controllers capable of performing both DMA data transfers and PIO data transfers between storage mediums and main memories, the interfacing controllers must also be capable of implementing unique timing parameters for DMA data transfers and PIO access and data transfers. The implementation of unique timing parameters may be historically derived from the separate development of DMA mode and PIO mode data transfers, and the unforseeable need to combine the two data transfer protocols.

In an attempt to standardize conventional interfacing parameters that are responsible for interfacing between storage mediums and main memories, "X3T10" a technical committee of Accredited Standards Committee (X3) proposed an industry standard entitled "AT-Attachment Interface with Extensions (ATA-2)" (ASC X3T10/0948D Revision 3, Jan. 17, 1995). This document is hereby incorporated by reference, and a copy may be obtained from Global Engineering Documents, Englewood, Colo.

Although the "proposed ATA-2 standard" provides adequate teachings for performing data transfers under DMA and PIO modes, once a particular mode is initiated, other modes may not be initiated until the entire data transfer has been completed under the initiated mode. As is well known in the art, there may be instances where performing a PIO mode access via a software driver will be necessary to poll the status of an on-going DMA mode data transfer. However, since the timing associated with PIO mode accesses are different from DMA mode data transfers, any PIO mode access attempted while a DMA mode data transfer is in progress will be denied until the DMA mode data transfer proceeds in its entirety to completion.

For illustration purposes, FIG. 1 is a schematic diagram illustrating a storage device 100 coupled to a controller interface 101 by means of a bi-directional control path 105. Controller unit 101 is in turn coupled to a CPU 102 by means of a bi-directional data path 108(*a*), and CPU 102 is coupled to a main memory unit 104 by means of another bi-directional data path 108(*b*). Main memory unit 104 is then coupled to controller interface 101 by means of a bi-directional data path 106. It should be apparent to those skilled in the art that bidirectional data path 108(*a*) and bi-directional data path 108(*b*) may be used to perform PIO mode accessing and transfers to and from storage medium 100 and main memory unit 104. Further, bi-directional data path 106 may be used to perform DMA mode data transfers between main memory unit 104 and storage medium 100.

In operation, both PIO and DMA mode data transfers may be handled by controller interface 101 which is in charge of receiving data transfer requests and determining the specific timing parameters required for the requested data transfer. As mentioned above, once a DMA mode data transfer has commenced, controller interface 101 will set the data transfer timing and proceed under the set timing until the entire data transfer is complete. As is well-known to those skilled in the art, there are times when the status of an on-going data transfer needs to be determined (especially during lengthy data transfers). Unfortunately, once the DMA data transfer is on-going, controller interface 101 may not interrupt the transfer to perform a PIO mode access (e.g., to poll the status register) since the cycle timings associated with PIO mode and DMA mode are different and incompatible.

There are several direct disadvantages resulting form the inability of controller interface 101 to interrupt on-going data transfer protocols having different timing parameters. By way example, since PIO mode accesses and data transfers are controlled by CPU 102, when a PIO mode access or transfer is denied during a DMA mode data transfer, CPU 102 will be required to wait until the DMA mode data transfer has been completed. As can be appreciated, this may result in severe processing inefficiencies since CPU 102 will be unable to perform other processing tasks. This may be further exacerbated in circumstances where large DMA data transfers are in progress, and the waiting period may be exceedingly long.

There may also be circumstances where controller interface 101 will inadvertently allow a PIO mode access while a DMA mode data transfer is in progress. In such a circumstance, there may be a danger overlapping PIO and DMA mode timing cycles, which could possibly lead to data corruption and possible data loss.

Therefore, in view of the foregoing, what is needed is an method and apparatus for interleaving DMA and PIO mode timing cycles to enable PIO mode accesses and data transfers in between DMA data transfers without causing CPU interrupts nor causing data corruption or loss.

SUMMARY OF THE INVENTION

The present invention discloses an apparatus and method for prioritizing and interleaving data transfer protocols between storage mediums and main memories.

In one preferred embodiment, an apparatus for interleaving data transfer protocols is disclosed. The apparatus is preferably coupled to at least one storage medium, a random access memory and a central processing unit that is capable of receiving data transfer protocol requests to and from the at least one storage medium and random access memory that are coupled to the central processing unit. Further, a controller interface is operatively connected to the central processing unit, the random access memory and the storage medium and is configured to receive data transfer protocol requests and detect data transfer protocol requests having different timing parameters.

The apparatus is also preferably equipped with an arbitration unit that is operatively coupled to the controller interface and is configured to assign priorities to the detected data transfer protocols having different timing parameters. The arbitration unit may also compare the assigned priorities to detected data transfer protocol requests and produce arbitration information. Based on the arbitration information, arbitration unit may then interrupt one of the detected data transfer protocols for another one of the detected data transfer protocols and then, resume the interrupted one of the detected data transfer protocol after the another one of the detected data transfer protocol has completed.

In another preferred embodiment, a method for interleaving data transfer protocols is disclosed. The method begins by preparing a memory and at least one storage medium for a data transfer by identifying selected registers in the memory and the at least one storage medium where a direct memory access data transfer protocol will occur. Next, the direct memory access data transfer protocol between the identified registers in the memory and at least one storage medium will commence. A programming input/output data transfer request may then be received while the direct memory access data transfer protocol is in progress. The direct memory access data transfer protocol may then be interrupted after a current data transfer cycle has been completed. Once the direct memory access data transfer is interrupted, the programming input/output data transfer is enabled. After the programming input/output data transfer is complete, the direct memory access data transfer protocol may be resumed.

BRIEF DESCRIPTION OF THE DRAWINGS

The invention, together with further advantages thereof, may best be understood by reference to the following description taken in conjunction with the accompanying drawings in which:

FIG. 4 is a table illustrating the timing parameters associated with initiating a PIO data transfer or access in accordance with one embodiment of the present invention.

FIG. 5 is a table illustrating the timing parameters associated with resuming a previously interrupted DMA data transfer in accordance with one embodiment of the present invention.

DETAILED DESCRIPTION OF THE PREFERRED EMBODIMENTS

Figure 1:
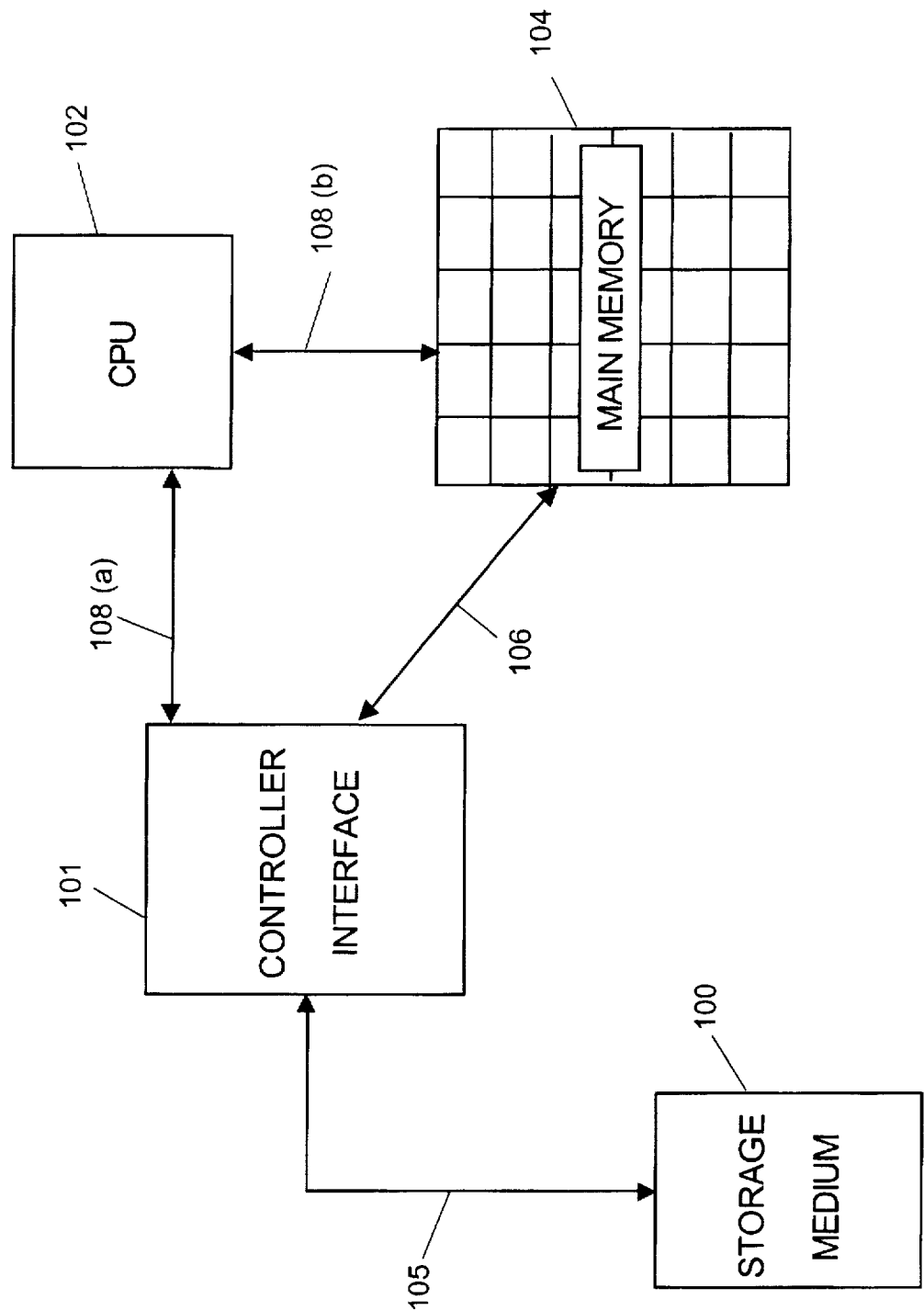
FIG. 1 illustrates a conventional controller interface that may be implemented in performing PIO and DMA mode data transfers between a main memory and storage mediums.

FIG. 1 schematically illustrates a conventional controller interface responsible for managing data access and transfer requests.

The present invention discloses an apparatus and method for prioritizing and interleaving data transfer protocols between storage mediums and main memories. In one embodiment, a controller interface is operatively connected to a plurality of storage mediums, a main memory and a central processing unit (CPU). The controller interface is preferably configured to receive and detect data transfer protocol requests having different timing parameters. Once the controller interface receives a data transfer protocol request, an arbitration unit that is operatively coupled to said controller interface assigns priorities to the detected data transfer protocols having different timing parameters. The arbitration unit then compares the assigned priorities, and interrupts an on-going data transfer protocol when a newly received data transfer protocol is assigned a higher priority. The data transfer protocol assigned the high priority is then commenced and proceeds to completion. Once the high priority data transfer protocol is complete, the interrupted data transfer protocols is resumed.

Figure 2A:
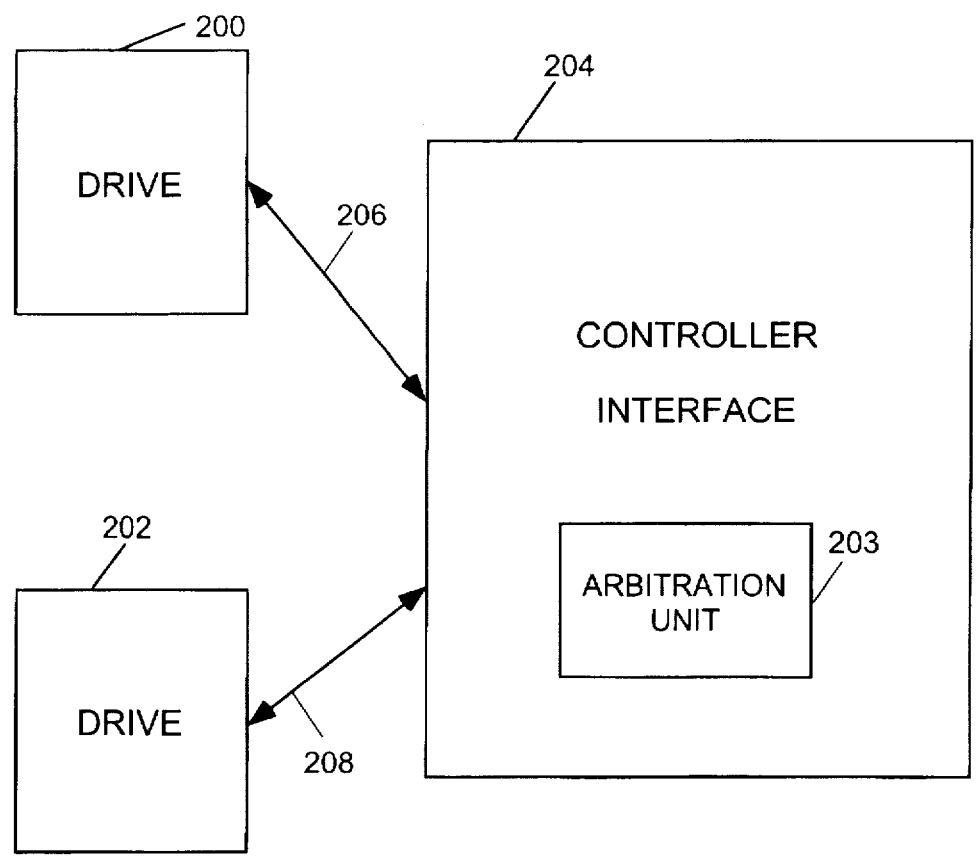
FIGS. 2A and 2B illustrate diagrammatic representations of controller interfaces having arbitration units configured to assign priorities to received data transfer protocol requests in accordance with one embodiment of the present invention.

FIG. 2A schematically illustrates a controller interface 204 being operatively coupled to a drive 200 by a bi-directional control path 206. Controller interface 204 is also shown operatively coupled to a drive 202 by a bidirectional control path 208. Drive 200 and drive 202 may be any storage mediums suitable for storing data. By way of example, drives 200 and 202 may be an internal or external hard drive, disk drive, CD-ROM, tape drive, etc. Further, an arbitration unit 203 is shown logically integrated within controller interface 204, and is configured to prioritize data transfer protocols received by controller interface 204. It should be appreciated that although arbitration unit 203 is shown integrated within controller interface 204, any other equivalent integrated circuit logic which is external to controller interface 204 may be substituted therefor.

In one embodiment, the data transfer protocols received by controller interface 204 may be direct memory access (DMA) data transfer protocols or programming input/output (PIO) data transfer protocols. DMA data transfers are typically preferred when large blocks of data must be transferred between a main memory and a selected storage medium. As is well known in the art, DMA data transfer protocols also provide an effective way of transferring data without requiring constant CPU intervention.

For illustration purposes, assume that a DMA data transfer is requested between a main memory (not shown for ease of illustration) and drive 202. Before the DMA data transfer protocol can commence, an initial PIO "access" is generally required to identify the location of the registers (i.e., control registers) that will be used in the transfer. Although some CPU bandwidth will be required to perform the PIO access, once the registers have been identified, the subsequent DMA data transfer may proceed without further CPU intervention.

On the other hand, a PIO data transfer will generally require constant CPU assistance during the data transfer process. For illustration purposes, assume that a PIO data transfer is requested between main memory and drive 200 while a DMA data transfer is currently being processed between main memory and drive 202 as described above. At this point, controller interface 204 will detect an incoming PIO data transfer request, and arbitration unit 203 will identify the newly received data transfer request as a "PIO" data transfer request, and assign the data transfer request a high priority.

Arbitration unit 203 will then compare the priority previously assigned to the on-going DMA data transfer. Because DMA data transfer protocols will generally be assigned a low priority, arbitration unit will determine that the on-going DMA data transfer has a lower priority that the newly received PIO data transfer protocol request. Upon making this determination, arbitration unit 203 will interrupt the on-going DMA data transfer.

In one embodiment, DMA data transfer protocols will be interrupted when controller 204 receives a distinctive "command structure and address range" which informs controller 204 that the detected data transfer protocol is a PIO data transfer protocol request. As mentioned above, arbitration unit 203 will then assign the received PIO data transfer request a high priority, and determine whether there are other data transfers currently being process which have a lower priority (e.g., DMA data transfer protocols). If there are, arbitration unit 203 will interrupt the on-going low priority data transfer protocol as described above.

However, the DMA data transfer interruption will not be performed until a current data transfer cycle has been completed. In this manner, data is not inadvertently corrupted by interrupting DMA data transfers in the middle of a data transfer cycle. Once a current DMA data transfer cycle has been completed, the DMA data transfer between controller interface 204 and drive 202 will be suspended. Thereafter, the requested PIO data transfer that was assigned high priority by arbitration unit 203 may commence between controller interface 204 and drive 200.

The commenced PIO data transfer will then be performed to completion, and thereafter the DMA data transfer will also be resumed to completion unless a new PIO data transfer is received by controller interface 204 before the entire DMA data transfer has been completed. If a new PIO data transfer is received (and assigned a high priority by arbitration unit 203), the DMA data transfer will again be interrupted while the newly received PIO data transfer is processed.

It should be appreciated that interleaving PIO data transfers in between DMA data transfers has many practical advantages. By way of example, when arbitration unit 203 assigns a high priority status to PIO data transfers and interrupts on-going DMA data transfers (having low priority), the CPU in charge of processing the PIO data transfer is guarded against having to wait in an "idle" state while DMA data transfers are processed. In some cases, it may be extremely important that PIO data transfers are given higher priority than DMA data transfers since some DMA data transfers may take a very long time to process which may potentially hold up the CPU from processing other tasks.

Figure 2B:
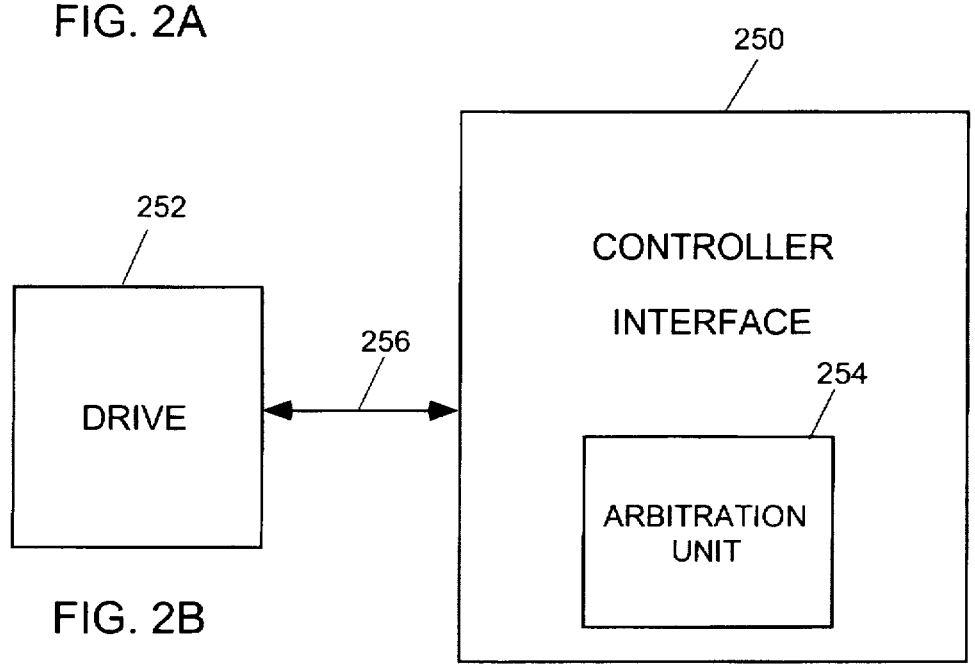

FIG. 2B illustrates another embodiment having a controller interface 250 operatively coupled to a single drive 252 by means of a bi-directional control path 256. For illustration purposes only, an arbitration unit 254 is shown integrated within controller interface 250. Although it should be appreciated by those skilled in the art that arbitration unit 254 may be operatively coupled to controller interface 250 by implementing any integrated circuit arrangement. As described above, arbitration unit 254 is configured to detect incoming data transfer protocol requests (e.g., having different timing parameters), and assign a priority based upon the characteristics of the request.

This embodiment is directed at situations where the status of an on-going DMA transfer needs to be ascertained. By way of example, drive 252 will generally include a control register which contains a status register that may be polled to determine the status of drive 252. When a status check is requested by a CPU, it is generally obtained by initiating a PIO "access" to drive 252 while the DMA data transfer protocol is in progress. However, as described above, the different PIO and DMA timing parameters will not allow simultaneous PIO and DMA operations. Consequently, the PIO access request must be interleaved with an on-going DMA data transfer protocol.

For illustration purposes, assume that a DMA data transfer is in progress, and a status check is requested by the CPU. A PIO access request will then be sent by the CPU to controller interface 250. Once the PIO access is detected by controller interface 250, arbitration unit 254 will identify the request as a PIO access and assign it a high priority. Next, arbitration unit 254 will compare the priority of the on-going DMA data transfer and determine that it was given a low priority. Arbitration unit 254 will then interrupt the ongoing low priority DMA data transfer after the current data cycle has been completed. The high priority PIO access will then be initiated while the DMA data transfer awaits completion of the PIO access. Once the PIO access is complete, the DMA data transfer may be reinitiated from where it was interrupted.

As can be appreciated, permitting CPU controlled PIO accesses to the control registers in the middle of a DMA data transfer advantageously averts CPU interrupts that could potentially cause the CPU to sit in an idle state while a possibly lengthy DMA data transfer proceeds to completion.

Of course, PIO accesses may be required to access other registers (i.e., other than the status registers) contained within the control register of drive 252. By way of example, a PIO access may be necessary to access command registers, address registers, sector count registers, cylinder registers, etc. which may be located in the control register of drive 252.

Figure 3:
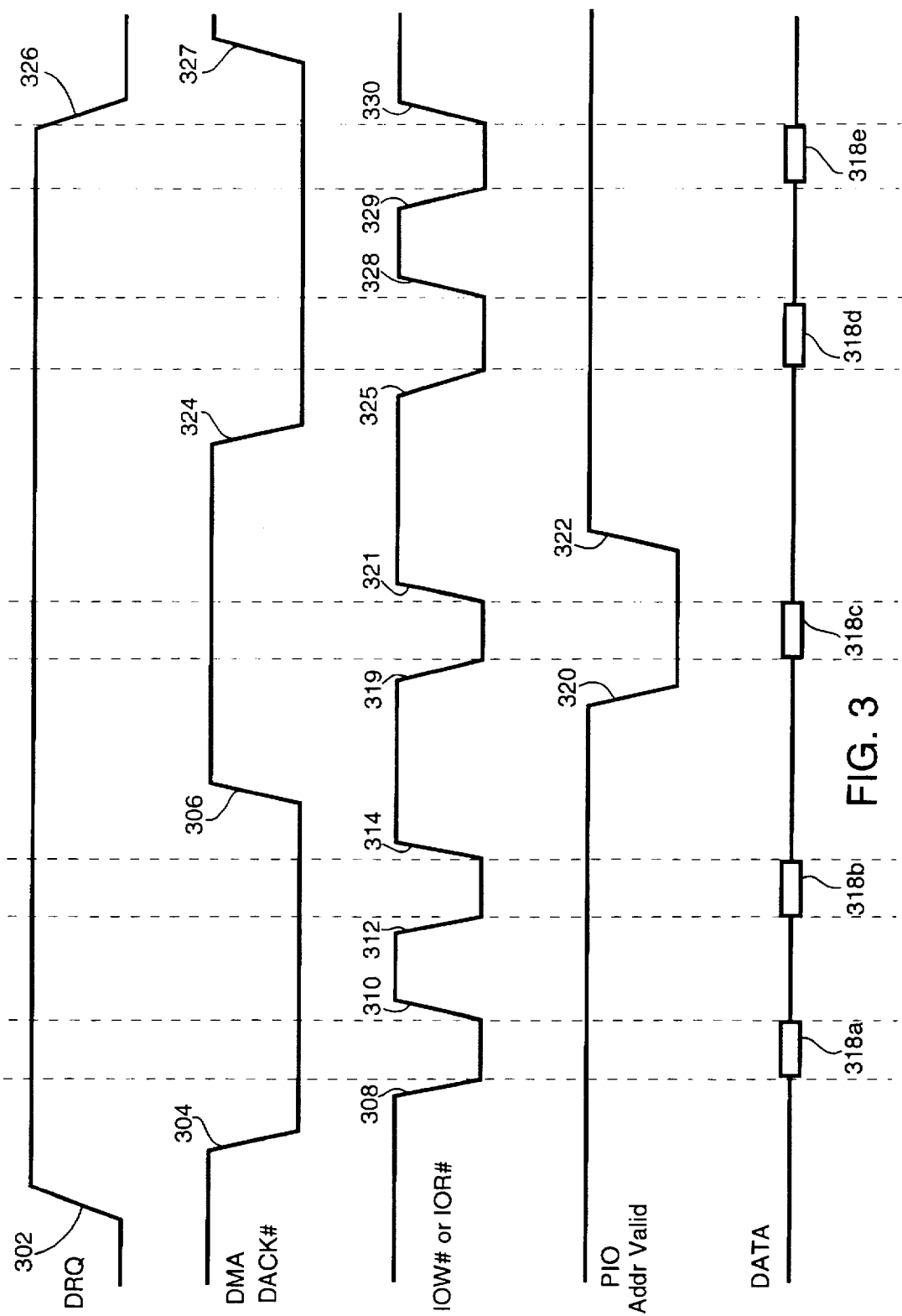
FIG. 3 is a timing diagram illustrating the timing parameters associated with interleaving PIO data transfers and accesses in between on-going DMA data transfers in accordance with one embodiment of the present invention.

Reference is now drawn to FIG. 3, which illustrates the timing diagrams associated with interleaving DMA data transfers and PIO data transfers and accesses to and from main memory and at least one storage medium (i.e., a drive). As shown, there are five signals used to indicate when the DMA data transfers or PIO data transfers and accesses are in progress. These signals are further described in the proposed ATA-2 standards document that was previously incorporated be reference.

In one embodiment, the topmost signal represents a DMA request (DRQ) which acts as a handshake to inform controller interface 204 of FIG. 2A or controller interface 250 of FIG. 2B that a DMA data transfer protocol is being requested. The second signal from the top is a DMA acknowledge (DACK#) which signals the starting and ending times of a DMA data transfer. The pound sign (#) is used to indicate that the DACK# will be activated when the signal reaches a falling edge (e.g., # ≡ active low). Conversely, a rising edge will indicate that the on-going DMA data transfer has been completed or has been interrupted to allow a higher priority PIO data transfer or access to be processed.

The third signal from the top is used to indicate whether the DMA data transfer is being written from a main memory to a storage medium (IOW#), or reading from a storage medium to a main memory (IOR#). For example, when the third signal reaches a falling edge, a write or a read (W/R) will be processed based upon the instructions received from the CPU. Therefore, upon reaching a rising edge, the W/R operation will complete processing. The forth signal from the top is an address valid ("addr Valid") signal which is used to indicate when a PIO data transfer or access is being processed. The fifth and final signal illustrated is a data ("DATA") signal which indicates when the data transfer cycles are begin performed in relation to the time periods where DMA and PIO data transfers are occurring.

In order to clearly convey the timing transitions associated with performing both DMA and PIO data transfers, FIG. 3 will be described with reference to an example. The example will illustrate the steps involved when: (1) a DMA data transfer is initiated, (2) a PIO data transfer request is received, (3) a DMA data transfer is interrupted, (4) the PIO data transfer is performed, and (5) the interrupted DMA data transfer is resumed.

For ease of illustration, the following discussion will reference FIG. 2A, although the timing signals are equally applicable to the embodiment illustrated in FIG. 2B. When a DMA request (DRQ) goes high at a time 302, a DMA data transfer request will be received by controller 204 of FIG. 2A. The DRQ at time 302 therefore indicates that a DMA data transfer is ready to be initiated. By way of example, when drive 202 sends a DRQ signal at time 302 to controller interface 204, drive 202 has indicated that it is ready to transfer data to or from main memory in DMA mode.

Following the DRQ request at time 302, a DACK# will be initiated to begin the DMA data transfer when a falling edge is detected at a time 304. The commenced DMA data transfer will then continue the data transfer cycles until a rising edge is detected a time 306. Between time 304 and time 306, a W/R was initiated at a time 308 when the falling edge was detected. The W/R will therefore continue until a time 310 when a rising edge is detected by controller interface 204. By way of example, between time 308 and time 310, a data cycle 318a was either written or read during the W/R operation. As illustrated, a second W/R operation was also performed during the active DMA data transfer times 304 to 306. In particular, a W/R operation was performed between times 312 and 314 where a data cycle 318b was transferred in DMA mode.

While the DMA data transfer was being processed, controller 204 and its associated arbitration unit 203 received a PIO data transfer request. As described above, the PIO data transfer request is assigned a high priority, and arbitration unit 203 will compare the received PIO data transfer request with the on-going DMA data transfer being processed. Arbitration unit 203 then sends an interruption signal to drive 202 so that the higher priority PIO data transfer may commence. However, as described above, the DMA data transfer will not cease until the current data cycle is complete. In this embodiment, data cycle 318b is the current data cycle being completed before actually interrupting the DMA data transfer.

Once the DMA data transfer has been interrupted at time 306, the requested PIO data transfer will commence at a falling edge shown (i.e., the forth signal from the top "addr Valid" signal) at a time 320. During the PIO data transfer, a W/R operation is initiated at a falling edge at a time 319. The data being written or read during this PIO data transfer is indicated by a data cycle 318c on the DATA signal line. The PIO data transfer will then proceed until completion which is illustrated by a rising edge at a time 322. While PIO data transfer is being processed, the suspended DMA data transfer will be awaiting a command from arbitration unit 203 to resume the DMA data transfer. When the PIO data transfer is complete at time 322, controller interface 204 will receive a completion signal via bidirectional control path 208. Arbitration unit 203 will then re-initiate the interrupted DMA data transfer as illustrated by a falling edge at a time 324.

During the re-initiated DMA data transfer, two more data write/read (W/R) operations will be performed as illustrated by falling edges at times 325 and 329 and rising edges at times 328 and 330. The data transferred during the aforementioned W/R operations are thus illustrated as data cycles 318d and 318e. The DMA data transfer will then continue until all of the data cycles have been completed, the DRQ will then experience a falling edge at a time 326 which signifies the completion of the DMA data transfer. In this embodiment, once the DRQ signal is received by controller interface 204, the DACK# signal may experience a rising edge at a time 327 signifying the end of the DMA data transfer operation.

In sum, the DMA data transfers of this embodiment were performed between times 304 and 306 and 324 and 327, and the PIO data transfer was performed between times 320 and 322. The PIO data transfer was therefore interleaved between the DMA data transfer. Consequently, the timing signals were advantageously coordinated to interrupt an on-going DMA data transfer to permit a higher priority PIO data transfer to be processed and thereby avoid interrupting the CPU.

FIG. 4 is a timing table illustrating the timing parameters associated with commencing a PIO data transfer after a DMA data transfer is interrupted in accordance with one embodiment of the present invention. As shown in FIG. 3, time 320 ($T_{320}$) is where a falling edge occurs indicating an "active low" for a PIO data transfer. In order to avoid overlapping the timing parameters of the on-going DMA data transfer occurring between time 304 and time 306, $T_{320}$ may not occur earlier than the later of time 314 ($T_{314}$)+($T_{KR}$ or $T_{KW}$) where $T_{KR\ (negate\ pulse\ width)}$ and $T_{KW\ (negate\ pulse\ width)}$ are defined in the proposed ATA-2 standard (page 112, FIG. 12) as the minimum command recovery time or command inactive time. In addition, $T_{KR}$ is used when an IOR# (read) is being performed, and $T_{KW}$ is used when a IOW# (write) is being performed.

$T_{320}$ may also not occur earlier than the later of time $T_{314}$+($T_F$ or $T_H$) where $T_{F\ (data\ hold)}$ and $T_{H\ (data\ hold)}$ are also defined in the proposed ATA-2 standard. Finally, $T_{320}$ may also not occur earlier than the later of $T_{314}$+$T_{J\ (DMACK\ hold)}$. As mentioned above, the timing parameters $T_{KR}$, $T_{KW}$, $T_F$, $T_H$, and $T_J$ are fully described in the proposed ATA-2 standard that was previously incorporated by reference. At this point, the PIO data transfer will proceed from time $T_{320}$ to time 322 ($T_{322}$) where the PIO data transfer is complete.

FIG. 5 is a timing table illustrating the timing parameters associated with resuming a DMA data transfer after being interrupted by a high priority PIO data transfer in accordance with one embodiment of the present invention. Time 324 ($T_{324}$), as described in FIG. 3 illustrates the resumption of an interrupted DMA data transfer indicated by a falling edge active low.

In one embodiment, $T_{324}$ is defined as being no earlier than the later of time 321 ($T_{321}$)+$T_{21\ (recovery\ time)}$, where $T_{21}$ is the minimum command recovery time or command inactive time as described in the proposed ATA-2 standard (page 109, FIG. 10). $T_{21}$ may also be defined as $T_0$–$T_2$ (8 bits), where $T_o$ is defined as the minimum cycle time from one leading edge to the next leading edge and $T_2$ is defined as the minimum command active time. $T_{324}$ may also be defined as being no earlier than the later of $T_{321}$+$T_{4\ (datahold)}$ or $T_{6\ (data\ hold)}$, where $T_{4\ (data\ hold)}$ is used during a write operation and $T_{6\ (data\ hold)}$ is used during a read operation. Finally, $T_{324}$ may be defined as being no earlier than the later of $T_{321}$+$T_9$ where $T_9$ is defined as and address valid hold. For more information on timing parameters $T_{21}$, $T_4$, $T_6$, and $T_9$, reference may be made to the proposed ATA-2 standard document.

Figure 6:
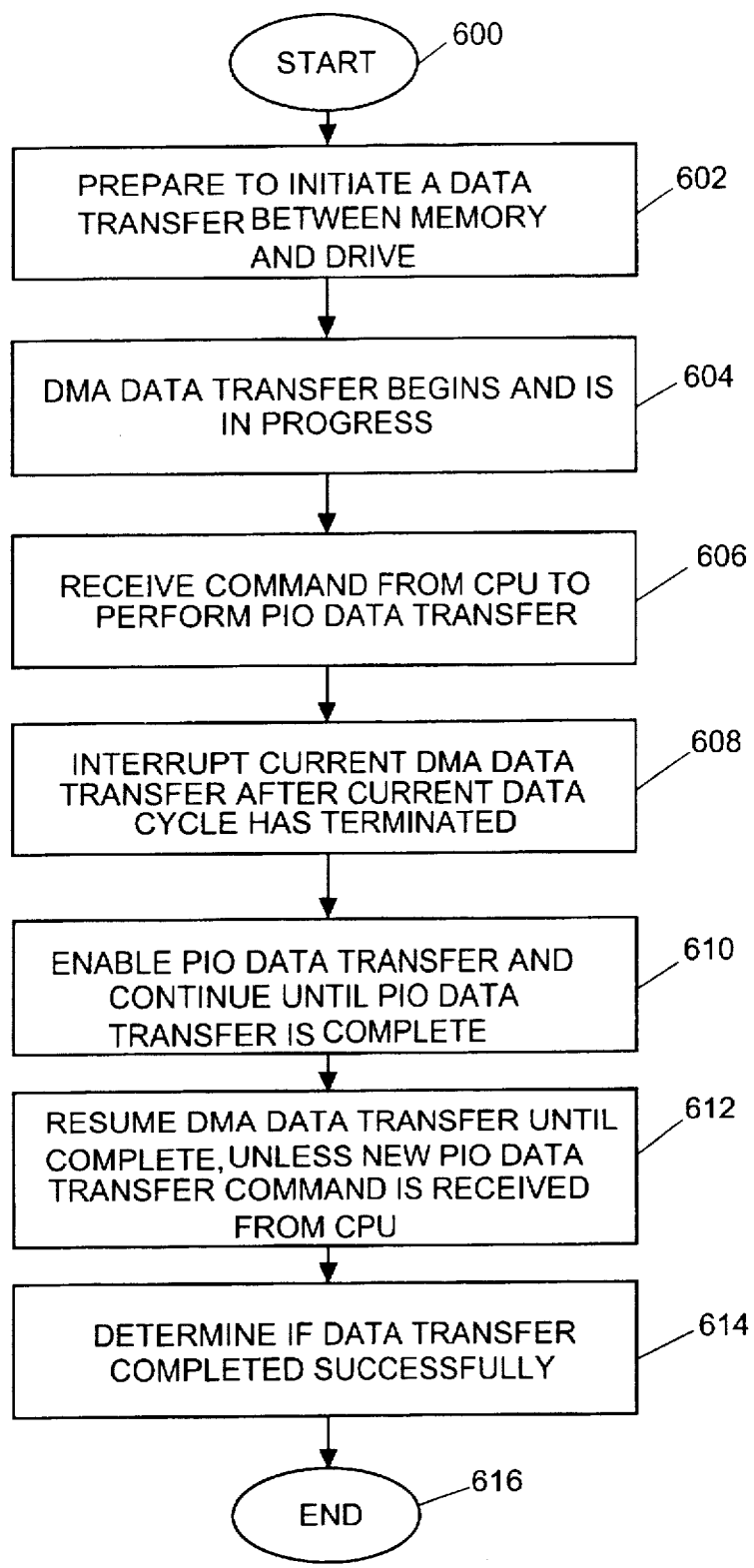
FIG. 6 is a flowchart diagram illustrating the method steps associated with performing DMA data transfers and interleaving PIO access and data transfers in accordance with one embodiment of the present invention.

The above-described embodiments may be further understood with reference to a flowchart presented in FIG. 6. The flowchart of FIG. 6 illustrates the method steps associated with performing DMA data transfers and interleaving PIO access and data transfers in accordance with one embodiment of the present invention. The method starts at a step 600. From step 600, the method proceeds to a step 602 where controller interface 204 of FIG. 2A receives a DMA data transfer request. In one embodiment, the DMA data transfer request may be prompted by software being executed by a CPU (not shown for ease of illustration). Arbitration unit 203 then assigns the DMA data transfer request a low priority before beginning the DMA data transfer between a main memory and drive 202.

The method then proceeds to a step 604 where the DMA data transfer begins. By way of example, this means that a DRQ has been asserted at time 302 of FIG. 3, and DACK# is in the active low state at time 304. Once the DMA data transfer is in progress, the method proceeds to a step 606 where a software command is received by the CPU, and the CPU sends a PIO data transfer request to controller 204 of FIG. 2A. Arbitration unit 203 then assigns a high priority to the received PIO data transfer request and compares it to the priority assigned to the DMA data transfer that is in progress.

The method then proceeds to a step 608 where the DMA data transfer is interrupted after the current data cycle has terminated. By way of example, FIG. 3 shows the DMA data transfer being interrupted at the end of data cycle 318b which is prompted by the end of the W/R cycle at time 314. Once the DMA data transfer has been interrupted, the method will proceeds to a step 610 where the requested PIO data transfer is enabled. In one embodiment, once the PIO data transfer is enabled, the PIO data transfer may continue to its completion. As illustrated in FIG. 3, the PIO data transfer may begin at time 320 and end at time 322 after data cycle 318c has been transferred either in or out of main memory from drive 200 of FIG. 2A.

Once the PIO data transfer has been completed at time 322, the method will proceed to a step 612 where the DMA data transfer may resume at time 324 of FIG. 3. As described in FIG. 5, time 324 will occur no earlier than the later of $T_{321}+T_9$. As mentioned above, the DMA data transfer will generally resume to completion unless a new PIO data transfer request (i.e., assigned a high priority) is received by arbitration unit 203 before the DMA data transfer has finished. By way of example, the DMA data transfer will resume at time 324 and continue until time 327 after data cycles 318d and 318e have been completed.

The method then proceeds to a step 614 where it is determined whether the DMA and PIO data transfers have been completed successfully. In one embodiment, the CPU may poll the control registers in drives 200 and 202 to determine whether the transfer was completed successfully. If the transfers were completed successfully, the method will proceed to a step 618 where the method ends.

The present invention may be implemented using any type of integrated circuit logic or software. By way of example, a hardware description language (HDL) layout program may be used to design the silicon-level circuitry necessary to appropriately interleave PIO data transfers and accesses with DMA data transfers in accordance with one embodiment of the present invention. In one embodiment, a VHDL® hardware description language available from IEEE of New York, N.Y. is preferably used to design the silicon-level layout. Although any suitable layout tool may be used, another layout tool may include a hardware description language "Verilog®" tool available from Cadence Design Systems, Inc. of Santa Clara, Calif.

While this invention has been described in terms of several preferred embodiments, there are alterations, permutations, and equivalents which fall within the scope of this invention. It should also be noted that there are many alternative ways of implementing both the process and apparatus of the present invention. It is therefore intended that the following appended claims be interpreted as including all such alterations, permutations, and equivalents as fall within the true spirit and scope of the present invention.

What is claimed is:

1. An apparatus for interleaving data transfers, said apparatus coupled at least one storage medium, a random access memory and a central processing unit capable of receiving data transfer protocol requests to and from said at least one storage medium and said random access memory that are coupled to said central processing unit, comprising:

a controller interface, operatively connected to said central processing unit, said random access memory and said storage medium, for receiving said data transfer protocol requests and detecting said data transfer protocol requests having different timing parameters; and an arbitration unit, operatively coupled to said controller interface, configured to assign priorities to said detected data transfer protocols having different timing parameters, comparing the assigned priorities to said detected data transfer protocol requests to produce arbitration information, and interrupt one of said detected data transfer protocols for another one of said detected data transfer protocols based on the arbitration information, and resuming the interrupted one of said detected data transfer protocol after the another one of said detected data transfer protocol has completed;

wherein the data transfer protocol requests assigned a low priority by said arbitration unit permit data transfer protocol requests assigned a high priority to interrupt and proceed prior to completing said low priority data transfer protocols; and said interrupted low priority data transfer protocol completes a current data transfer cycle and a minimum command recovery time before permitting said high priority data transfer protocol to begin.

2. The apparatus for interleaving data transfers as recited in claim 1, wherein said priorities assigned to said data transfer protocols is based upon the timing associated with each respective data transfer protocol.

3. The apparatus for interleaving data transfers as recited in claim 1, wherein the minimum command recovery time is a $T_{kR}$ period for a read operation and a $T_{kw}$ for a write operation.

4. The apparatus for interleaving data transfers as recited in claim 1, wherein said interrupted low priority data transfer protocol resumes after said high priority data transfer protocol is complete and a resume minimum command recovery time has lapsed.

5. The apparatus for interleaving data transfers as recited in claim 1, wherein said data transfer protocol assigned said low priority is a direct memory access protocol.

6. The apparatus for interleaving data transfers as recited in claim 1, wherein said data transfer protocol assigned said high priority is a programming input/output data transfer protocol.

7. The apparatus for interleaving data transfers as recited in claim 1, wherein said controller interface is coupled to at least two of said storage mediums.

8. The apparatus for interleaving data transfers as recited in claim 1, wherein said storage mediums are selected from the group consisting essentially of a hard drive, a CD-ROM, a disk drive, and a tape drive.

9. The apparatus for interleaving data transfers as recited in claim 1, wherein said apparatus is fabricated on a silicon substrate.

10. The apparatus for interleaving data transfers as recited in claim 1, wherein said apparatus is software based.

11. A method for interleaving data transfer protocols, the method comprising the steps of preparing a memory and at least one storage medium for a data transfer by identifying selected registers in said memory and said at least one storage medium where a direct memory access data transfer protocol will occur;

commencing said direct memory access data transfer protocol between the identified registers in said memory and said at least one storage medium;

receiving a programming input/output data transfer request while said direct memory access data transfer protocol is in progress, interrupting said direct memory access data transfer protocol after a current data transfer cycle of said direct memory access data transfer protocol is complete and a minimum command recovery time has lapsed;

enabling said programming input/output data transfer, and completing said programming input/output data transfer; and resuming said direct memory access data transfer protocol after the completing of said programming input/output data transfer and a resume minimum command recovery time has lapsed.

12. The method for interleaving data transfer protocols as recited in claim 11, wherein said direct memory access data transfer protocol and said programming input/output data transfer protocol have different timing parameters.

13. The method for interleaving data transfer protocols as recited in claim 12, further including the substep of:

arbitrating between said direct memory access data transfer protocols and said programming input/output data transfer protocols; and assigning programming input/output data transfer protocols absolute priority over said direct memory access data transfer protocols.

14. The method for interleaving data transfer protocols as recited in claim 12, wherein the steps of interleaving data transfer protocols are processed on a silicon-based integrated circuit logic layout.

15. The method for interleaving data transfer protocols as recited in claim 14, wherein the a silicon-based integrated circuit logic layout is designed with the aid of a hardware descriptive language layout tool.

16. The method for interleaving data transfer protocols as recited in claim 15, wherein said hardware descriptive language layout tool is selected from the group consisting essentially of VHDL and Verilog.

17. The method for interleaving data transfer protocols as recited in claim 12, wherein the steps of interleaving data transfer protocols are performed using software programming instructions.

18. A data transfer apparatus configured to interleave different timing data transfer protocols, comprising:

a memory means and at least one storage medium means implemented to transfer data between selected registers in said memory means and said at least one storage medium means;

a processing means configured to receive requests for a direct memory access data transfer and a programming input/output data transfer between selected registers in said memory means and said at least one storage medium means;

an arbiter means configured to assign a high priority to said programming input/output data transfer request, assign a low priority to said direct memory access data transfer requests, and interrupt an on-going direct memory access data transfer assigned said low priority upon receiving said high priority programming input/output data transfer request, but not until a current cycle of said direct memory access data transfer is complete; and an initiating means configured to process said programming input/output data transfer to completion, and resume said interrupted on-going direct memory access data transfer after a resume minimum recovery time has lapsed.

19. A data transfer apparatus configured to interleave different timing data transfer protocols as recited in claim 18, wherein said programming input/output data transfer is only initiated after a minimum recovery time has lapsed after the current cycle of said direct memory access data transfer is complete.

20. The apparatus for interleaving data transfers as recited in claim 1, wherein said data transfer protocol request is configured to initiate a data transfer or a status access.

21. The apparatus for interleaving data transfers as recited in claim 20, wherein said data transfer protocol request is a programming input/output access that is configured to perform the status access.

22. The apparatus for interleaving data transfers as recited in claim 21, wherein said status access is made from one of a control register, a command register, an address register, a sector count register, and a cylinder register.

* * * * *